Patented May 5, 1936

2,039,414

UNITED STATES PATENT OFFICE 2,039,414

METHOD OF PRODUCING FOLLICLE HORMONE HYDRATES

Friedrich Hildebrandt, Hohen Neuendorf, near Berlin, Germany, and Erwin Schwenk, New York, N. Y., assignors to Schering-Kahlbaum A. G., Berlin, Germany No Drawing. Application October 21, 1933, Serial No. 694,687. In Germany October 27, 1932

10 Claims. (Cl. 260—154)

This invention relates to hormones, and more particularly to the production of follicle hormone hydrates.

It is an object of this invention to provide means whereby follicle hormone hydrates are obtained by using reduction products of the follicle hormones as starting materials and subjecting the latter to an oxidizing treatment.

The reduction products of the follicle hormones as they are described and claimed in our co-pending application Ser. No. 694,686, filed Oct. 21, 1933, and entitled Hydrogenation products of follicle hormones and method of producing same are products whereby the ketogroup of the follicle hormone is reduced to the secondary alcohol group by taking up two hydrogen atoms. These products contain the benzene ring, recently assumed to be present by Butenandt, in not hydrogenated form. According to said application these products are obtained by subjecting such follicle hormones to the action of catalytically activated hydrogen, thereby avoiding the presence of a substantial excess of hydrogen, and by either using highly diluted alcoholic solutions of the follicle hormones or by employing reduction catalysts of low activity which do not attack the benzene ring. Or we may employ hydrogen which is activated by other agents or in another manner, such as for instance atomic hydrogen or hydrogen in statu nascenti. These hydrogenation products may be obtained by acting on the follicle hormones with compounds containing hydrogen and capable of giving off said hydrogen in the presence of a hydrogenation catalyst. They may be obtained by reacting the follicle hormones with alcoholates. Still another method consists in first producing the oxime of the follicle hormone, reducing the same to the corresponding amine and subjecting the latter to the action of nitrites at elevated temperatures.

It has been found that it is possible to use these products as starting materials for the synthetic production of hormone hydrates, for instance of that which has become known by the publications of Marrian. The reaction consists in first producing an unsaturated phenol, for instance by splitting off water between the secondary alcohol and the neighboring methylene group of the above mentioned reduction products of follicle hormones and then treating the obtained unsaturated phenol with oxidizing agents which add two OH-groups to the double bond, i. e. have an oxidizing and hydratizing effect.

The starting products may for example be designated by the following structural formula:

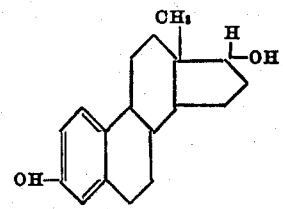

By splitting of $H_2O$ between the secondary alcohol and the adjacent methylene group the following unsaturated phenol is obtained:

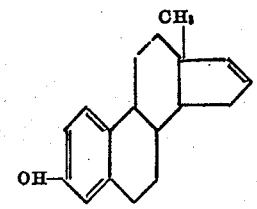

Upon oxidation with suitable agents the double bond is broken and two OH groups are introduced in place thereof as shown by the following structural formula:

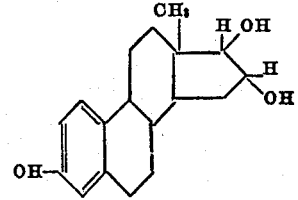

The above formulas merely illustrate but do not limit the present invention.

The term "follicle hormone hydrates" as used hereinafter in the specification and in the claims annexed hereto includes all oestrogenous compounds derived from the follicle hormones which contain at least two neighboring hydroxyl groups, i. e. a glycol configuration in the molecule.

The splitting off of water is effected, for instance, by heating the reduction products of the follicle hormones with potassium bisulfate or other dehydrating agents or by first esterifying them with acids which, on splitting off the acid, yield the desired unsaturated phenols. Such acids are, for instance, hydrobromic acid which proved to be especially suitable, hydroiodic acid, toluene sulfonic acid, and the like. These acids are preferably employed in mixture with glacial acetic acid or other dehydrating agents, such as concentrated sulfuric acid, phosphoric acid, or the like.

Suitable oxidizing agents are, for instance, very diluted permanganate solutions, or hydrogen peroxide, preferably with the addition of catalysts, furthermore the so-called per-acids, such as perbenzoic acid and the like.

Contrary to expectations it was found that, on esterification with the above mentioned acids (hydrobromic acid and the like), the reaction proceeds apparently in such a manner that the unsaturated phenols are obtained directly. The reaction products with hydrohalic acids, for instance, are completely free of halogen.

The course of the reaction is not quite clear; but it may be assumed, as already stated above, that the products of reduction of the follicle hormones, on reacting with the above mentioned acids, are at the same time esterified and the esters decomposed to the unsaturated phenols.

It was also found that the unsaturated phenols obtained according to these methods can be oxidized very readily. It is already sufficient to boil these compounds in the presence of air- or oxygen-containing gases with water, aqueous salt solutions or aqueous solvents, such as aqueous methanol and the like, in order to transform the double bond of the unsaturated phenol into the glycol configuration.

Example 1 gram of the reduced follicle hormone of the formula $C_{18}H_{24}O_2$ is mixed intimately with 5 grams of finely pulverized anhydrous potassium bisulfate. The mixture is heated for 2 hours at 120° C. in a small retort, whereafter the organic compound sublimated off by carefully heating the mixture in a high vacuum. A white sublimate is obtained.

0.5 gram of the latter which represents a phenol of the formula $C_{18}H_{22}O$ are dissolved in 30% acetic acid. A small amount of silver sulfate and acid sodium sulfate as catalysts and one and a half times as much of 15% hydrogen peroxide as required for the formation of the two OH-groups, are added to this solution. The mixture is allowed to stand for 5 hours at 30° to 40° C. whereafter it is diluted with much water and extracted with ether. After evaporation of the ether a crude crystalline product remains which on repeated recrystallization from aqueous alcohol yields a follicle hormone hydrate which corresponds to the formula $C_{18}H_{24}O_3$.

The process is not limited to the reduction product of the follicle hormone, having a melting point of 172–173° C. (in pure form 174° C.) but can be applied also to the isomeric reduction product $C_{18}H_{24}O_2$ of the melting point 202–204° C., whereby likewise two stereoisomeric follicle hormone hydrates of the formula $C_{18}H_{24}O_3$ are obtained.

The reduction products of other follicle hormones than that of the formula $C_{18}H_{22}O_2$, such as for instance of equilin, hippolin, and the like, as well as of synthetic products having similar physiological effects may also be used as starting materials in this process.

Various changes may be made in the details disclosed in the foregoing specification, in accordance with the principles set forth herein and in the claims annexed hereto.

What we claim, is:

1. The method of producing follicle hormone hydrates containing two neighboring hydroxyl groups which comprises transforming the reduction products of the follicle hormones, which contain one secondary alcohol group in the molecule, into the unsaturated phenols and treating the latter with an oxidizing agent capable of adding two hydroxyl groups to the double bond of said phenols.

2. The method of producing follicle hormone hydrates containing two neighboring hydroxyl groups which comprises transforming the reduction products of the follicle hormones, which contain one secondary alcohol group, into the unsaturated phenols by treating said reduction products with agents capable of splitting off water, and treating said unsaturated phenols with an oxidizing agent capable of adding two hydroxyl groups to the double bond of said phenols.

3. The method of producing follicle hormone hydrates containing two neighboring hydroxyl groups which comprises treating the reduction products of the follicle hormones, which contain one secondary alcohol group, with agents capable of splitting off water between the secondary alcohol and the neighboring methylene group and subjecting the obtained unsaturated phenols to the action of oxidizing agents capable of adding two hydroxyl groups to the double bond of said phenols.

4. The method of producing follicle hormone hydrates containing two neighboring hydroxyl groups which comprises treating the reduction products of the follicle hormones, which contain one secondary alcohol group, with anhydrous alkali bisulfate at an elevated temperature substantially above normal room temperature and subjecting the obtained unsaturated phenols to the action of per acid compounds.

5. The method of producing follicle hormone hydrates containing two neighboring hydroxyl groups which comprises treating the reduction products of the follicle hormones, which contain one secondary alcohol group, with anhydrous alkali bisulfate at an elevated temperature substantially above normal room temperature, subjecting the obtained unsaturated phenols to the action of per acid compounds and purifying the obtained follicle hormone hydrates.

6. The unsaturated phenols obtained by splitting off water from the reduction products of the follicle hormones, which contain one secondary alcohol group, which phenols exhibit a golden-yellow color and fluorescence on testing their solutions in concentrated sulfuric acid by means of an ultraviolet lamp.

7. The unsaturated phenols having a follicle hormone nucleus, wherein the end positioned five carbon ring contains an unsaturated double bond.

8. The unsaturated phenol having the following general structural formula:

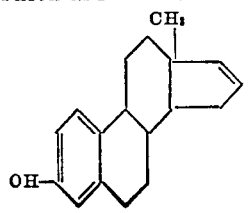

9. In the method of producing follicle hormone hydrates containing two neighboring hydroxyl groups the step which comprises treating a follicle hormone having a secondary alcohol group with a dehydrating agent to split off $H_2O$ between said secondary alcohol group and the neighboring methylene group to form an unsaturated phenol.

10. The method of producing follicle hormone hydrates containing two neighboring hydroxyl groups which comprises treating a follicle hormone having a secondary alcohol group with a dehydrating agent to split off $H_2O$ between said secondary alcohol group and the neighboring methylene group to form an unsaturated phenol and then treating said phenol with an agent having an oxidizing effect, said agent being capable of adding two OH groups in place of the double bond of said unsaturated phenol.

FRIEDRICH HILDEBRANDT.
ERWIN SCHWENK.